(12) United States Patent
Omar

(10) Patent No.: US 12,519,864 B2
(45) Date of Patent: Jan. 6, 2026

(54) DEVICE, APPARATUS, METHOD AND COMPUTER PROGRAMS FOR A NETWORK GATEWAY, SERVER, SERVER APPARATUS, SERVER METHOD, SYSTEM, ROUTER, MOBILE DEVICE, VEHICULAR GATEWAY AND CLOUD SERVER

(71) Applicant: MaxLinear, Inc., Carlsbad, CA (US)

(72) Inventor: Mohamed Omar, Unterhaching (DE)

(73) Assignee: MaxLinear, Inc., Carlsbad, CA (US)

( * ) Notice: Subject to any disclaimer, the term of this patent is extended or adjusted under 35 U.S.C. 154(b) by 852 days.

(21) Appl. No.: 15/638,457

(22) Filed: Jun. 30, 2017

(65) Prior Publication Data

US 2019/0007311 A1    Jan. 3, 2019

(51) Int. Cl.
| | |
|---|---|
| *H04L 67/00* | (2022.01) |
| *G06F 21/53* | (2013.01) |
| *H04L 12/46* | (2006.01) |
| *H04L 41/50* | (2022.01) |
| *H04L 45/586* | (2022.01) |
| *H04L 67/025* | (2022.01) |

(52) U.S. Cl.
CPC .............. *H04L 67/34* (2013.01); *G06F 21/53* (2013.01); *H04L 12/46* (2013.01); *H04L 45/586* (2013.01); *H04L 67/025* (2013.01); *H04L 41/5096* (2013.01)

(58) Field of Classification Search
CPC ..... H04L 45/586; H04L 12/46; H04L 67/025; H04L 67/34; H04L 67/42; H04L 41/5096; H04L 67/01; G06F 21/53
See application file for complete search history.

(56) References Cited

U.S. PATENT DOCUMENTS

| | | | |
|---|---|---|---|
| 2003/0237016 A1* | 12/2003 | Johnson | G06Q 10/10 714/4.1 |
| 2013/0086202 A1* | 4/2013 | Connelly | G06F 8/61 709/217 |
| 2014/0126581 A1* | 5/2014 | Wang | H04L 41/0273 370/431 |
| 2017/0054600 A1* | 2/2017 | Leung | H04W 48/16 |
| 2017/0131987 A1* | 5/2017 | Chen | G06F 8/60 |
| 2018/0316555 A1* | 11/2018 | Salgueiro | G06N 20/00 |
| 2018/0359220 A1* | 12/2018 | Trivelpiece | G06F 21/602 |

OTHER PUBLICATIONS

Examination Report in European Application No. 18175270.0 mailed Jan. 31, 2023.

(Continued)

*Primary Examiner* — Eric Myers
(74) *Attorney, Agent, or Firm* — Buchalter; Jason W. Croft

(57) ABSTRACT

A device for controlling a network gateway comprises at least one network interface configured to communicate in at least one computer network. The device further comprises a processing module configured to at least partially execute at least a first software module and a second software module. The first software module is configured to provide a gateway functionality of the network gateway via the at least one network interface. A functionality of the second software module is different from the gateway functionality of the first software module. The second software module is encapsulated from the first software module.

21 Claims, 7 Drawing Sheets

(56) References Cited

OTHER PUBLICATIONS

Extended European Search Report for European Application No. 18175270.0, mailed Oct. 18, 2018, 10 Pages.
Office Action for European Application No. 18175270.0, dated Jan. 18, 2024, 9 Pages.
Partial Search Report of European Patent Application No. 24213406.2 mailed Feb. 28, 2025, 16 pages.
Extended European Search Report of European Patent Application No. 24213406.2 mailed May 19, 2025, 14 pages.

* cited by examiner

DEVICE, APPARATUS, METHOD AND COMPUTER PROGRAMS FOR A NETWORK GATEWAY, SERVER, SERVER APPARATUS, SERVER METHOD, SYSTEM, ROUTER, MOBILE DEVICE, VEHICULAR GATEWAY AND CLOUD SERVER

FIELD

Examples relate to a device, an apparatus, a method and computer programs for a network gateway, a server, a server apparatus, a server method, a system, a router, a mobile device, a vehicular gateway and a cloud server, more specifically, but not exclusively, to a device configured to execute a first software module and a second software module, wherein the first software module is encapsulated from the second software module.

BACKGROUND

Network gateways, e.g. home or office routers, mobile hotspots or vehicular gateways, are often used to connect one or more users from a first network to a second network, for example to the internet. A network gateway may therefore provide gateway functionality, e.g. translate between different protocols used within the first and second network, provide firewall functionality or provide network address translation.

BRIEF DESCRIPTION OF THE FIGURES

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B. An alternative wording for the same combinations is "at least one of A and B". The same applies for combinations of more than 2 Elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Figure 1:
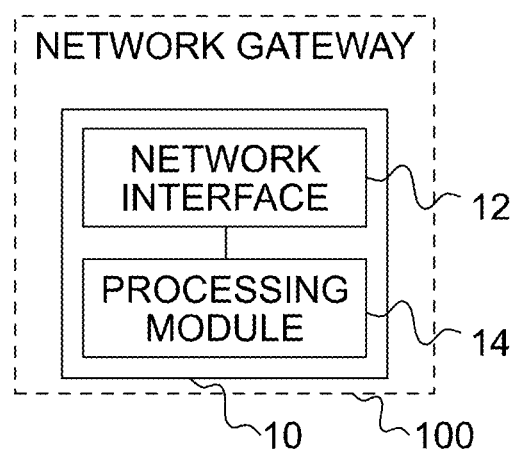
FIG. 1 shows a block diagram of an example of a device or an apparatus for controlling a network gateway.

FIG. 1 illustrates examples of a device 10 and an apparatus 10 for controlling a network gateway, a network gateway and a (remote) server 20. In the following multiple examples will be described in detail. The described device 10 corresponds to an apparatus 10 for controlling a network gateway. The components of the apparatus 10 are defined as component means which correspond to the respective structural components of the device 10. Examples further provide the network gateway 100 comprising the device 10 and the network gateway 100 comprising the apparatus 10.

FIG. 1 shows a block diagram of an example of a device 10 for controlling a network gateway 100. The device 10 comprises at least one network interface 12 configured to communicate in at least one computer network. The device 10 further comprises a processing module 14 configured to at least partially execute at least a first software module and a second software module. The first software module is configured to provide a gateway functionality of the network gateway 100 via the at least one network interface 12. A functionality of the second software module is different from the gateway functionality of the first software module. The second software module is encapsulated from the first software module.

Encapsulating the second software module from the first software module may increase a security of the first software module, as an access of the second software module to functionality of the first software module may be limited. This may enable an execution of third-party software modules alongside the first software module with a decreased impact on a security of the network gateway.

For example, the device 10 may be configured to perform the gateway functionality of the network gateway 100 (e.g. through the first software module). Alternatively, the device 10 may be configured to coordinate the gateway functionality of the network gateway (e.g. of the first software module), or the device 10 (e.g. the processing module 14) may be configured to provide an execution environment for providing the gateway functionality (through the first software module). For example, the network gateway may comprise the device 10. Alternatively, the device 10 may be comprised in an external entity, e.g. a central server or a cloud server.

For example, the network gateway 100 may be one of an office router, a wireless access point, a wireless hot spot, a home router, a network bridge, a vehicular gateway, a smart home router, a cloud server, a software-defined network entity or a mobile device, e.g. a mobile terminal, a smartphone or a tablet. For example, the network gateway may be configured to connect one or more users from a first network to a second network. For example, the at least one network interface 12 may be configured to communicate in the first network and in the second network. For example, the network gateway 100 may be configured to communicate using wired and/or wireless network access technologies.

In various examples, the at least one network interface 12 may be configured to communicate within wired networks and/or within wireless networks. For example, the at least one network interface 12 may be configured to communicate via Ethernet. Additionally or alternatively, the at least one network interface 12 may be configured to communicate via a wireless local area network (WLAN) and/or via a cellular mobile communication system. In general, the mobile communication system may, for example, correspond to one of the Third Generation Partnership Project (3GPP)-standardized mobile communication networks, where the term mobile communication system is used synonymously to mobile communication network. The mobile or wireless communication system may correspond to, for example, a 5th Generation system (5G), a Long-Term Evolution (LTE), an LTE-Advanced (LTE-A), High Speed Packet Access (HSPA), a Universal Mobile Telecommunication System (UMTS) or a UMTS Terrestrial Radio Access Network (UTRAN), an evolved-UTRAN (e-UTRAN), a Global System for Mobile communication (GSM) or Enhanced Data rates for GSM Evolution (EDGE) network, a GSM/EDGE Radio Access Network (GERAN), or mobile communication networks with different standards, for example, a Worldwide Inter-operability for Microwave Access (WIMAX) network IEEE 802.16 or Wireless Local Area Network (WLAN) IEEE 802.11, generally an Orthogonal Frequency Division Multiple Access (OFDMA) network, a Time Division Multiple Access (TDMA) network, a Code Division Multiple Access (CDMA) network, a Wideband-CDMA (WCDMA) network, a Frequency Division Multiple Access (FDMA) network, a Spatial Division Multiple Access (SDMA) network, etc. In some examples, the at least one network interface 12 may be configured to communicate in a smart home communication network, e.g. using the ZigBee or Z-Wave protocol. For example, the at least one network interface 12 may comprise one or more inputs and/or outputs for receiving and/or transmitting information, which may be in digital (bit) values according to a specified code, within a module, between modules or between modules of different entities. In at least some examples, the at least one network interface 12 may correspond to a means for communication.

In examples the processing module 14 may be implemented using one or more processing units, one or more processing devices, any means for processing, such as a processor, a computer or a programmable hardware component being operable with accordingly adapted software. In other words, the described function of the processing module 14 may as well be implemented in software, which is then executed on one or more programmable hardware components. Such hardware components may comprise a general purpose processor, a Digital Signal Processor (DSP), a micro-controller, etc.

In various examples, the processing module 14 may be configured to execute the first software module and the second software module. Alternatively, the processing module 14 may be configured to partially execute the first software module and/or the second software module. The first software module and/or the second software module may be at least partially executed on a remote server. This may reduce a processing load of the network gateway and may enable providing additional functionality through the network gateway. For example, the processing module 14 may be configured to execute at least an interface portion of the first software module and/or of the second software module and delegate other portions of the first software module and/or of the second software module for execution on a remote device or server. Alternatively, the device 10 may be comprised in a server, and the network gateway 100 may be configured to execute at least the interface portion of the first software module and/or of the second software module and the processing module 14 may be configured to execute the other portions of the first software module and/or of the second software module.

In various examples, the gateway functionality may comprise transmitting data packets of one or more users from a first network to a second network. For example, the gateway functionality may comprise a routing of the data packets to a destination within the second network. The gateway functionality may comprise a routing of incoming packets from the second network to users within the first network. The gateway functionality may comprise performing network address translation to enable a routing of packets from the second network (e.g. the internet) to users of the first network (e.g. a local network). For example, the gateway functionality may comprise firewall functionality, e.g. to block at least some packets from the second network from reaching the first network.

In various examples, the first software module is an operating system or a pre-installed software package of the device 10. For example, the first software module may at least comprise a plurality of software applications configured to provide the gateway functionality. Additionally, the first software module may comprise the operating system of the device 10 (or of the network gateway 100). Alternatively, the processing module 14 may be configured to execute the operating system of the device 10 (or of the network gateway 100), and to execute the first software module and the second software module encapsulated from the operating system. In some examples, the processing module 14 may be configured to provide a hypervisor environment, in which the first software module and the second software module are executed. For example, both the first software module and the second software module may comprise at least parts of an operating system of the device 10 (or of the network gateway 100). In some examples, the processing module 14 may be configured to provide an environment for running one or more containers, e.g. containers according to specifications of the Docker project. The second software module may be or comprise such a container, e.g. a Docker container. The processing module 14 may be configured to provide operating system-level virtualization to enable one or more software modules, e.g. the first software module and/or the second software module, to be executed within the same operating system and mutually encapsulated and encapsulated from the operating system.

In various examples, the second software module may be one of an internet of things gateway, a smart home hub, a home server, a home security application, a face recognition application and a virus scanner. The second software module may extend the functionality of the network gateway and may avoid having to maintain additional network devices. For example, the second software module comprise its functionality within an encapsulated package, e.g. within a virtual machine or within a container of an operating system-level virtualization environment. For example, the second software module may comprise libraries required for executing the second software module. In at least some examples, the processing module 14 may be configured to execute software within a kernel level or within a user level. The processing module 14 may be configured to execute the second software module within the user level.

In various examples, the processing module 14 may be further configured to at least partially execute a third software module. The third software module may be encapsulated from the first software module and from the second software module. This may enable an execution of a plurality of additional software modules which are mutually encapsulated. For example, the third software module may be implemented similar to the second software module, and/or the processing module 14 may be configured to execute the third software module similar to the second software module. The encapsulation of the third software module from the first software module may be implemented similar to the encapsulation from the second software module to the first software module. In at least some examples, the second software module may be fenced off from the third software module. For example, the third software module may be configured to communicate with the second software module via the first software module.

The second software module is encapsulated from the first software module. For example, an address space of the second software module may be separate from an address space of the first software module. In at least some examples, the second software module may be blocked from write access and/or read access to the address space of the first software module. In at least some examples, the second software module may be blocked from access to hardware of the device 10 and/or of the network gateway 100. The first software module being encapsulated from the second software module may correspond to the second software module being encapsulated from the first software module.

In various examples, the processing module 14 may be configured to sandbox the second software module within an execution environment of the first software module. This may encapsulate the first software module from the second software module. For example, the processing module 14 may be configured to provide an abstraction layer between an API (Application Programming Interface) call made by the second software module and an API of an operating system of the device 10 (e.g. the first software module) or of the network gateway 100. For example, the processing module 14 may be configured to block a direct access of the second software module to an operating system of the device 10 (e.g. the first software module) or of the network gateway 100. In various examples, the processing module 14 may be configured to contain the second software module within an encapsulated container.

In at least some examples, the processing module 14 may be configured to provide a software interface between the first software module and the second software module. The software interface may be used to encapsulate the first software module from the second software module and may be used to limit the access from the second software module to the first software module. For example, the software interface may comprise at least one element of the group of an API abstraction interface (e.g. an interface configured to provide an abstraction layer between an API call made by the second software module and an API of the first software module), a message passing abstraction interface, an inter-process communication abstraction interface, a socket communication abstraction interface and shared memory. For example, the software interface may provide an abstraction layer between (any) communication between the second software module and the first software module (e.g. the operating system of the device 10 and/or of the network gateway 100).

In various examples, the processing module 14 may be configured to limit an access from the second software module to the first software module through the software interface. This may increase a security within the first software module. For example, the processing module 14 may be configured to block access of the second software module to one or more functionalities of the first software module through the software interface. For example, the processing module 14 may be configured to disallow an access to one or more API calls of the first software module for the second software module. Alternatively or additionally, the processing module 14 may be configured to provide dummy responses to one or more disallowed API calls of the second software module to an API of the first software module. For example, the processing module 14 may be configured to redirect a write access of the second software module to resources or functionalities of the first software module to a temporary storage (e.g. within volatile memory). The processing module 14 may be configured to limit the access from the second software module to the first software module through the software interface based on a plurality of access rights. This may enable both a fine-grained control over access rights and an inspection by a user, as to which access rights have been permitted. For example, the plurality of access rights may relate to whether the second software module is entitled to at least one element of the group of access to the internet, access to a wired network, access to a wireless network, access to a memory of the network gateway, access to smart home communication hardware of the network gateway, access to one of a plurality of APIs of the first software module, access to power management functionality of the network gateway and access to a display (e.g. a liquid crystal display or a light emitting diode display) of the network gateway. For example, the plurality of access rights may specify, whether the second software module is permitted access to a plurality of functionalities of the first software module. The plurality of functionalities of the first software module may comprise at least one element of the group of access to the internet, access to a wired network, access to a wireless network, access to a memory of the network gateway, access to smart home communication hardware of the network gateway, access to one of a plurality of APIs of the first software module, access to power management functionality of the network gateway and access to a display (e.g. a liquid crystal display or a light emitting diode display) of the network gateway. In various examples, the processing module 14 may be configured to monitor an access from the second software module to the first software module through the software interface. This may enable monitoring that a privacy of a user of the network gateway is respected. For example, the processing module 14 may be configured to log access of the second software module to at least a subset of functionality of the first software module. Alternatively or additionally, the processing module 14 may be configured to scan data transmitted by the second software module for private information of a user of the network gateway, e.g. to identify an abuse of the private information. For example, the processing module 14 may be configured to determine a statistic of the access from the second software module to the first software module through the software interface, and to provide information related to the statistic (e.g. to an operator of a software marketplace providing the second software module, to enable the operator to discover malicious software).

In some examples, the processing module 14 may be configured to adjust an access limit and/or a monitoring of the access from the second software module to the first software module through the software interface based on an input of an operator. This may enable the operator (e.g. a user of the network gateway) to adjust the access rights or monitoring assigned to the second software module based on a compromise between functionality, privacy and security and/or based on a trust towards a provider of the second software module.

In various examples, the processing module 14 may be configured to obtain the second software module from a remote server 20. For example, the remote server 20 may comprise a software market or software repository for software modules to use as the second software module. The processing module 14 may be configured to download the second software module directly from the remote server 20. This may facilitate an access to the second software module and may further facilitate keeping the second software module updated. For example, the processing module 14 may be configured to download the software module over a secure connection, e.g. based on a secure hypertext transfer protocol (HTTPS). Alternatively, the processing module 14 may be configured to obtain the software module from the remote server via an intermediate device or storage, for example via a mobile device (e.g. a smart phone or a tablet computer) or via a personal computer (PC). In various examples, the processing module 14 is configured to obtain the second software module separately from the first software module. This may enable installing third-party software on the network gateway. For example, the processing module 14 may be configured to obtain the first software module and/or updates to the first software module (e.g. an operating system or pre-installed software of the device 10 or network gateway 100) via an update functionality of the first software module and to obtain the second software module from a software store providing the second software module. In some examples, a provider of (updates for) the first software module may be different from a provider of (updates for) the second software module.

In some examples, the processing module 14 may be configured to obtain the second software module based on information related to software modules previously used by a user of the network gateway. This may enable transferring software modules a user is using at another network gateway to the network gateway 100. For example, the processing module 14 may be configured to install and/or execute the second software module based on profile information of the user of the network gateway. For example, the user may supply the profile information to the network gateway when accessing the gateway (e.g. automatically or when logging into the network gateway).

In various examples, the processing module 14 may be configured to determine one or more capabilities required for executing the second software module. The processing module 14 may be configured to obtain the second software module if the device 10 or the network gateway 100 has the required capabilities. This may avoid installing incompatible software modules. For example, the second software module may comprise information related to the capabilities required for executing the second software module. The processing module 14 may be configured to obtain the information related to the capabilities required for executing the second software module before obtaining the second software module, and to obtain the second software module if the device 10 or the network gateway 100 has the required capabilities. For example, the processing module 14 may be configured to determine information related to one or more capabilities of the device 10 and/or of the network gateway 100. The processing module 14 may be configured to compare the information related to one or more capabilities of the device 10 and/or of the network gateway 100 with the one or more capabilities required for executing the second software module). For example, the one or more capabilities of the device 10 and/or of the network gateway 100 may comprise information related to at least one element of the group of a supported wired networking technology, a supported wireless networking technology, a supported wireless smart home communication technology, an available storage space, an available memory, a processor architecture, an operating system version, a software library version and an amount of available processing power.

Alternatively or additionally, the processing module 14 may be configured to provide the information related to the one or more capabilities of the device 10 (or of the network gateway 100) to the remote server 20. The processing module 14 may be configured to obtain information related to one or more software modules from the remote server 20 based on the information related to the one or more capabilities of the device 10 (or of the network gateway 100). For example, the one or more software modules may be suitable for execution by the processing module 14 based on the one or more capabilities of the device 10 (or of the network gateway 100). The processing module 14 may be configured to obtain one of the one or more software modules from the remote server 20. The processing module 14 may be configured to at least partially execute the one of the one or more software modules as the second software module. This may make it easier for a user of the network gateway to choose appropriate software modules for the network gateway.

In at least some examples, the processing module 14 may be configured to provide an interface for administering the device 10. For example, the interface for administering the device 10 may be a web interface or an interface towards a mobile application of a mobile device. The processing module 14 may be configured to authenticate a user requesting to use the interface using a proximity sensor. This may facilitate an authentication of the user. For example, the proximity sensor may be one of a Near Field Communication (NFC) sensor, a Bluetooth sensor or an Radio Frequency Identification (RFID) sensor.

FIG. 1 further shows a block diagram of an example of an apparatus 10 for controlling a network gateway 100. The apparatus 10 comprises at least one means for communication 12 configured for communicating in at least one computer network. The apparatus 10 further comprises a means for processing 14 configured for at least partially executing at least a first software module and a second software module. The first software module is configured to provide a gateway functionality of the network gateway 100 via the at least one means for communication 12. A functionality of the second software module is different from the gateway functionality of the first software module. The second software module is encapsulated from the first software module.

Figure 2:
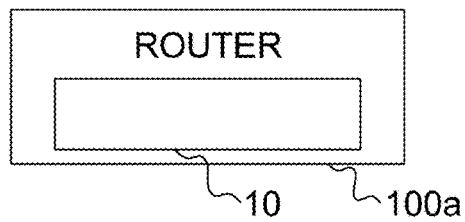
FIG. 2 shows a block diagram of an example of a router comprising a device or an apparatus.

FIG. 2 shows a block diagram of an example of a router 100a comprising the device 10 or the apparatus 10, e.g. the device 10 or the apparatus 10 introduced in connection with FIG. 1. Enabling an execution of the second software module on a home router may dispense with the need for additional devices, e.g. as smart home hubs or controllers. For example, the router 100a may be one of a home router, a mobile router (e.g. a mobile hotspot) and an office router. For example, the router 100a may be example of the network gateway 100.

More details and aspects of the router 100a are mentioned in connection with the proposed concept or one or more examples described above (e.g. FIG. 1). The router 100a may comprise one or more additional optional features corresponding to one or more aspects of the proposed concept or one or more examples described above or below.

Figure 3:
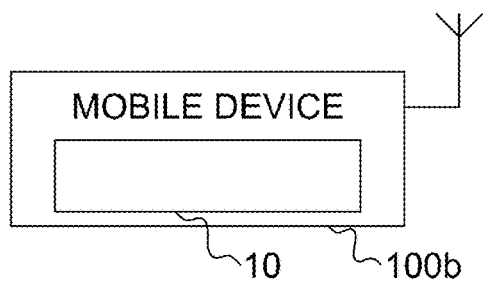
FIG. 3 shows a block diagram of an example of a mobile device comprising a device or an apparatus.

FIG. 3 shows a block diagram of an example of a mobile device 100b comprising the device 10 or the apparatus 10, e.g. the device 10 or the apparatus 10 introduced in connection with FIG. 1. A functionality of the mobile device, e.g. a mobile hotspot, may be extended by the second software module, e.g. to provide conferencing or collaboration functionality to a group of mobile users. For example, the mobile device 100b may be a mobile hotspot or a mobile relay station (e.g. a femtocell or a picocell). For example, the mobile device 100b may be example of the network gateway 100.

More details and aspects of the mobile device 100b are mentioned in connection with the proposed concept or one or more examples described above (e.g. FIGS. 1 to 2). The mobile device 100b may comprise one or more additional optional features corresponding to one or more aspects of the proposed concept or one or more examples described above or below.

Figure 4:
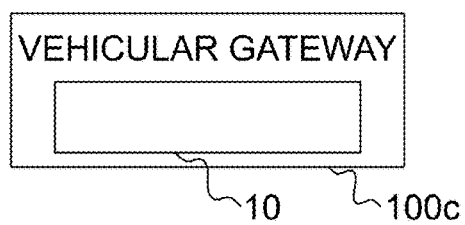
FIG. 4 shows a block diagram of an example of a vehicular gateway comprising a device or an apparatus.

FIG. 4 shows a block diagram of an example of a vehicular gateway 100c comprising the device 10 or the apparatus 10, e.g. the device 10 or the apparatus 10 introduced in connection with FIG. 1. This may enable additional functionality within the vehicle, e.g. a vehicle collaboration or video game platform. For example, the vehicular gateway 100c may be a mobile hotspot located within a vehicle, or a mobile relay station of a vehicle. For example, the vehicular gateway 100c may be example of the network gateway 100.

More details and aspects of the vehicular gateway 100c are mentioned in connection with the proposed concept or one or more examples described above (e.g. FIGS. 1 to 3). The vehicular gateway 100c may comprise one or more additional optional features corresponding to one or more aspects of the proposed concept or one or more examples described above or below.

Figure 5:
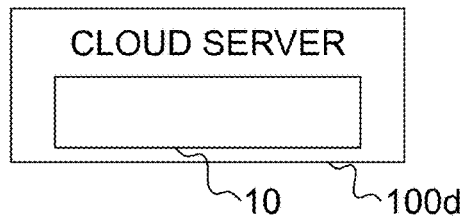
FIG. 5 shows a block diagram of an example of a cloud server comprising a device or an apparatus.

FIG. 5 shows a block diagram of an example of a cloud server 100d comprising the device 10 or the apparatus 10, e.g. the device 10 or the apparatus 10 introduced in connection with FIG. 1. This may enable a provision of network functionality, e.g. of a local server, while using the resources of the cloud server. For example, the cloud server 100d may be one of a server hosted in a data canter or a virtual appliance hosted within a data center. For example, the cloud server 100d may be located separate from the network gateway 100.

More details and aspects of the cloud server 100d are mentioned in connection with the proposed concept or one or more examples described above (e.g. FIGS. 1 to 4). The cloud server 100d may comprise one or more additional optional features corresponding to one or more aspects of the proposed concept or one or more examples described above or below.

Figure 6:
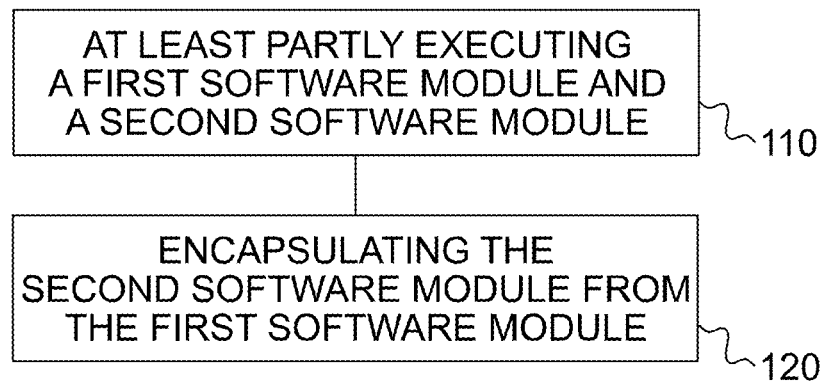
FIG. 6 shows a flow chart of an example of a method for controlling a network gateway.

FIG. 6 shows a flow chart of an example of a method for controlling a network gateway 100. For example, the method may be executed by the processing module 14 of the device 10 introduced in connection with FIG. 1. For example, the network gateway 100 may be implemented similar to the network gateway 100 introduced in connection with FIG. 1.

The method comprises at least partly executing 110 at least a first software module and a second software module. The first software module is configured to provide a gateway functionality of the network gateway 100. A functionality of the second software module is different from the gateway functionality of the first software module. The method further comprises encapsulating 120 the second software module from the first software module.

Encapsulating the second software module from the first software module may increase a security of the first software module, as an access of the second software module to functionality of the first software module may be limited. This may enable an execution of third-party software modules alongside the first software module with a decreased impact on a security of the network gateway.

More details and aspects of the method are mentioned in connection with the proposed concept or one or more examples described above (e.g. FIGS. 1 to 5). The method may comprise one or more additional optional features corresponding to one or more aspects of the proposed concept or one or more examples described above or below.

Figure 7:
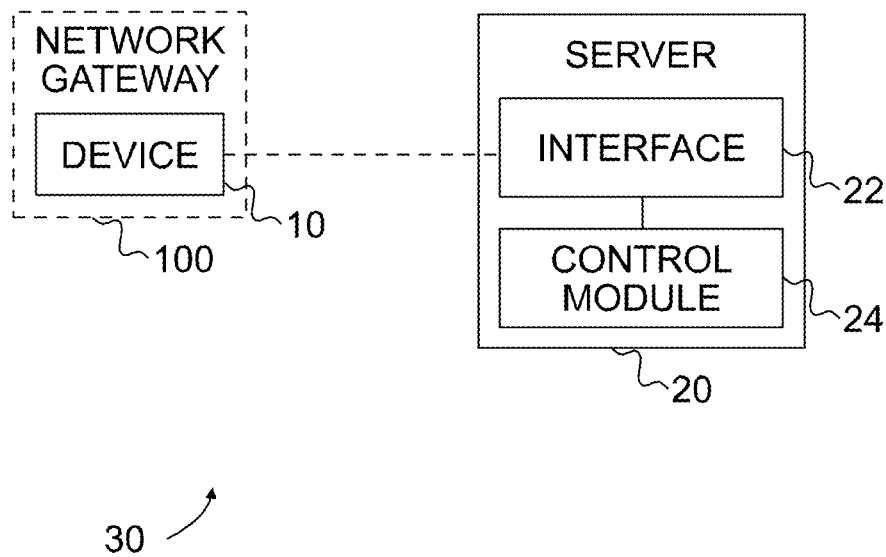
FIG. 7 shows a block diagram of an example of a server or of a server apparatus.

FIG. 7 illustrates an example of a server 20 and of a server apparatus 20. In the following, multiple examples will be described in detail. The described server 20 corresponds to a server apparatus 20. The components of the server apparatus 20 are defined as component means, which correspond to the respective structural components of the server 20.

FIG. 7 illustrates a block diagram of an example of a server 20. The server 20 comprises at least one interface 22 configured to communicate with a device 10 of a network gateway 100. The device 10 and/or the network gateway 100 may be implemented similar to the device 10 and/or the network gateway 100 introduced in connection with FIG. 1. The server 20 further comprises a control module 24 configured to maintain a plurality of software modules. At least a subset of the plurality of software modules are suitable to be executed by the device 10. The control module 24 is further configured to receive a download request related to a software module of the plurality of software modules for the device 10 via the at least one interface 22. The control module 24 is further configured to provide the software module for the device 10 via the at least one interface.

The server may provide a software market or repository of software modules to be executed by the network gateway, which may extend the functionality of the network gateway.

In various examples, the control module 24 may be configured to manage and/or provide the plurality of software modules. For example, the plurality of software modules may be a plurality of software applications accessible through a software marketplace implemented by the server 20. In at least some examples, the server 20 may be a server of a software marketplace or of an online software store. For example, the server 20 may be configured to provide an online storefront for software modules for a user of the network gateway 100. In various examples, the server 20 may be used as an online market for software modules. For example, the maintaining of the plurality of software modules may comprise providing the plurality of software modules to download for the network gateway 100.

In various examples, the subset of the plurality of software modules may be used as the second software module or the third software module by the device 10. For example, the plurality of software modules may be software modules suitable to be executed by a network gateway. For example, the plurality of software modules may comprise at least element of the group of an internet of things gateway, a smart home hub, a home server, a home security application, a face recognition application and a virus scanner.

In at least some examples, the download request may comprise information related to a title, information related to a locator or information related to an identifier for the software module. Alternatively or additionally, the download request may comprise information related to installed software modules, and the control module 24 may be configured to determine one or more software modules of the plurality of software modules requiring an updated version of the respective software modules. The control module 24 may be configured to determine the software module requested through the download request, and to provide the determined software module via the at least one interface 22.

In at least some examples, the control module 24 may be configured to obtain information related to one or more capabilities of the device 10 from the device 10. The control module 24 may be configured to provide information related to one or more software modules of the plurality of software modules to the device 10 based on the one or more capabilities of the device 10. For example, the control module 24 may be configured to choose the one or more software modules based on the one or more capabilities of the device 10, e.g. to select software modules suitable for execution by the device 10. For example, the control module 24 may be configured to query a database for software modules based on the one or more capabilities of the device. This may enable providing information related to the software modules, that the network gateway may be capable of executing, reducing frustration for the user.

In various examples, the control module 24 may be configured to directly transmit the software module to the device 10. For example, the device 10 may be configured to directly download the software module from the server 20. Alternatively, the control module 24 may be configured to indirectly provide the software module for the device 10 via an intermediate device or storage, e.g. via a download page or via a smartphone, tablet or PC of a user of the network gateway 100.

The at least one interface 22 may correspond any means for communication, e.g. to one or more inputs and/or outputs for receiving and/or transmitting information, which may be in digital (bit) values according to a specified code, within a module, between modules or between modules of different entities. In examples the control module 24 may be implemented using one or more processing units, one or more processing devices, any means for processing, any means for controlling, such as a processor, a computer or a programmable hardware component being operable with accordingly adapted software. In other words, the described function of the control module 24 may as well be implemented in software, which is then executed on one or more programmable hardware components. Such hardware components may comprise a general purpose processor, a Digital Signal Processor (DSP), a microcontroller, etc.

FIG. 7 further shows a server apparatus 20. The server apparatus 20 comprises at least one means for communication 22 configured for communicating with an apparatus 10 of a network gateway 100. The apparatus 10 may be implemented similar to an apparatus 10 introduced in connection with FIG. 1. The server apparatus 20 further comprises a means for controlling 24 configured for maintaining a plurality of software modules. At least a subset of the plurality of software modules are suitable to be executed by the apparatus 10. The means for controlling 24 is further configured for receiving a download request related to a software module of the plurality of software modules for the apparatus 10 via the at least one means for communication 22. The means for controlling 24 is further configured for providing the software module for the apparatus 10 via the at least one means for communication 22.

FIG. 7 further shows a system comprising the server 20 or the server apparatus 20 and the network gateway 100 with the device 10 or with the apparatus 10.

More details and aspects of the server 20 and/or of the server apparatus 20 are mentioned in connection with the proposed concept or one or more examples described above (e.g. FIGS. 1 to 6). The server 20 and/or the server apparatus 20 may comprise one or more additional optional features corresponding to one or more aspects of the proposed concept or one or more examples described above or below.

Figure 8:
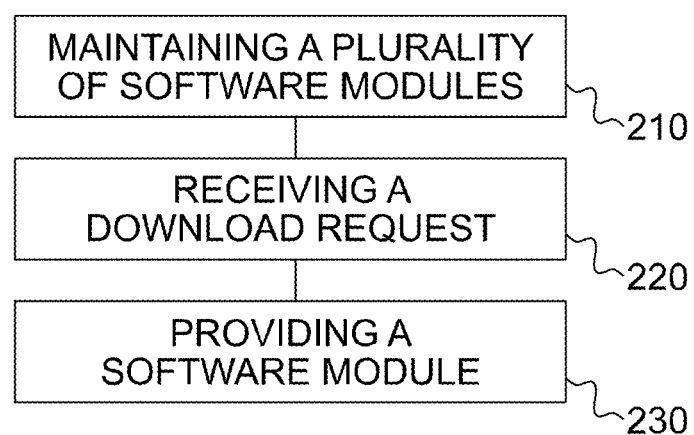
FIG. 8 shows a flow chart of an example of a server method.

FIG. 8 shows a flow chart of an example of a server method (e.g. for a server 20 as introduced in connection with FIG. 7). The server method comprises maintaining 210 a plurality of software modules, wherein at least a subset of the plurality of software modules are suitable to be executed by a network gateway 100. The server method further comprises receiving 220 a download request related to a software module of the plurality of software modules for the network gateway 100. The server method further comprises providing 230 the software module for the network gateway 100.

More details and aspects of the server method are mentioned in connection with the proposed concept or one or more examples described above (e.g. FIGS. 1 to 7). The server method may comprise one or more additional optional features corresponding to one or more aspects of the proposed concept or one or more examples described above or below.

At least some examples provide a customer premise equipment (CPE, e.g. the network gateway 100 introduced in connection with FIG. 1) software store. The CPE software store may be implemented by the server 20 introduced in connection with FIG. 7. At least some CPEs may comprise a powerful processor, that may be suitable to process different types of applications. At least some applications may be executable on different gateways, such as Face recognition and home security gateways. These applications may in some systems be installed on the gateways in their release depending on customer requirement.

At least some examples may be based on providing a (global) application software market for Gateways, e.g. where an end user will have the ability to buy, download and install various application on his own smart gateway.

This software market may provide:
A simpler way to install various applications on the gateways for manufacturer companies and customers.

A provider of network gateways may sell its own application on their own solutions and competitors platforms too.

End customers may search for gateways that support the software market in order to install various applications (e.g. an IoT (Internet of Things) application or Smart home gateway applications). The various applications may correspond to the second software modules introduced in connection with FIG. 1.

This may in some examples require modification in the gateway software stack, in order to enhance the security on the gateway with the installed applications and to be adapted to the new environment.

At least some examples may provide a software market for all types of smart gateways as home gateways and gateways in automotive, which end users may access in an easy way to install various applications on it. Since a sizeable portion of the CPE market is based on the OpenWrt project, it may be useful to have a software market that supports different types of platforms. The concept may further support running or installing Windows or Linux operating systems smart gateways (e.g. as second software module).

In some systems, the application provided to a network gateway may depend on customer's requirements. Application or hardware developers might also target the end user by providing them the capability to download different application (e.g. second software modules) that may not be provided by their ISPs (Internet Service Providers). In some systems, end user might not be able to install various application on their gateways.

At least some examples may enable developing a software market that targets all types of gateways.

Figure 9:
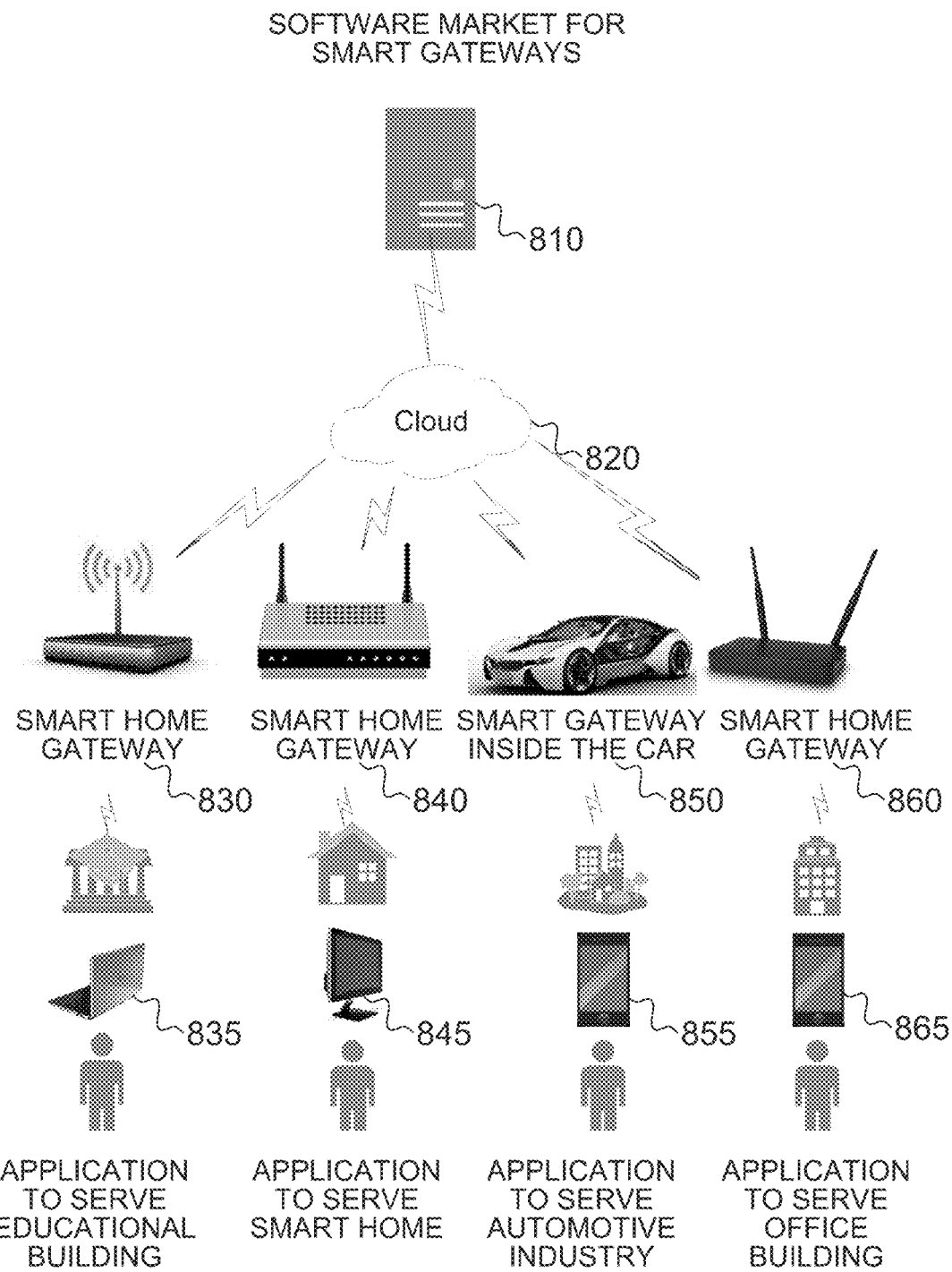
FIG. 9 shows a schematic diagram of various types of (smart) gateways and how applications can be installed.

FIG. 9 shows a schematic diagram of various types of (smart) gateways and how applications can be installed. The end user may have the ability to install application on this gateway through various interfaces:

For example, a software market for smart gateways 810 may provide software modules via the cloud 820 to a plurality of smart gateways, e.g. smart home gateways 830, 840 and 860 and a smart gateway inside a car 850. For example, the smart home gateway 830 may be configured to execute 835 an application (e.g. a second software module) to serve an educational building, which may be accessed by a user using a (mobile) computer. The smart home gateway 840 may be configured to execute 845 an application (e.g. a second software module) to serve a smart home, which may be accessed by a user using a smart television. The smart gateway inside the car 850 may be configured to execute 855 an application (e.g. a second software module) to serve the automotive industry, which may be accessed using a mobile device. The smart home gateway 860 may be configured to execute 865 an application (e.g. a second software module) to serve an office building, which may be accessed using a mobile device.

Figure 10:
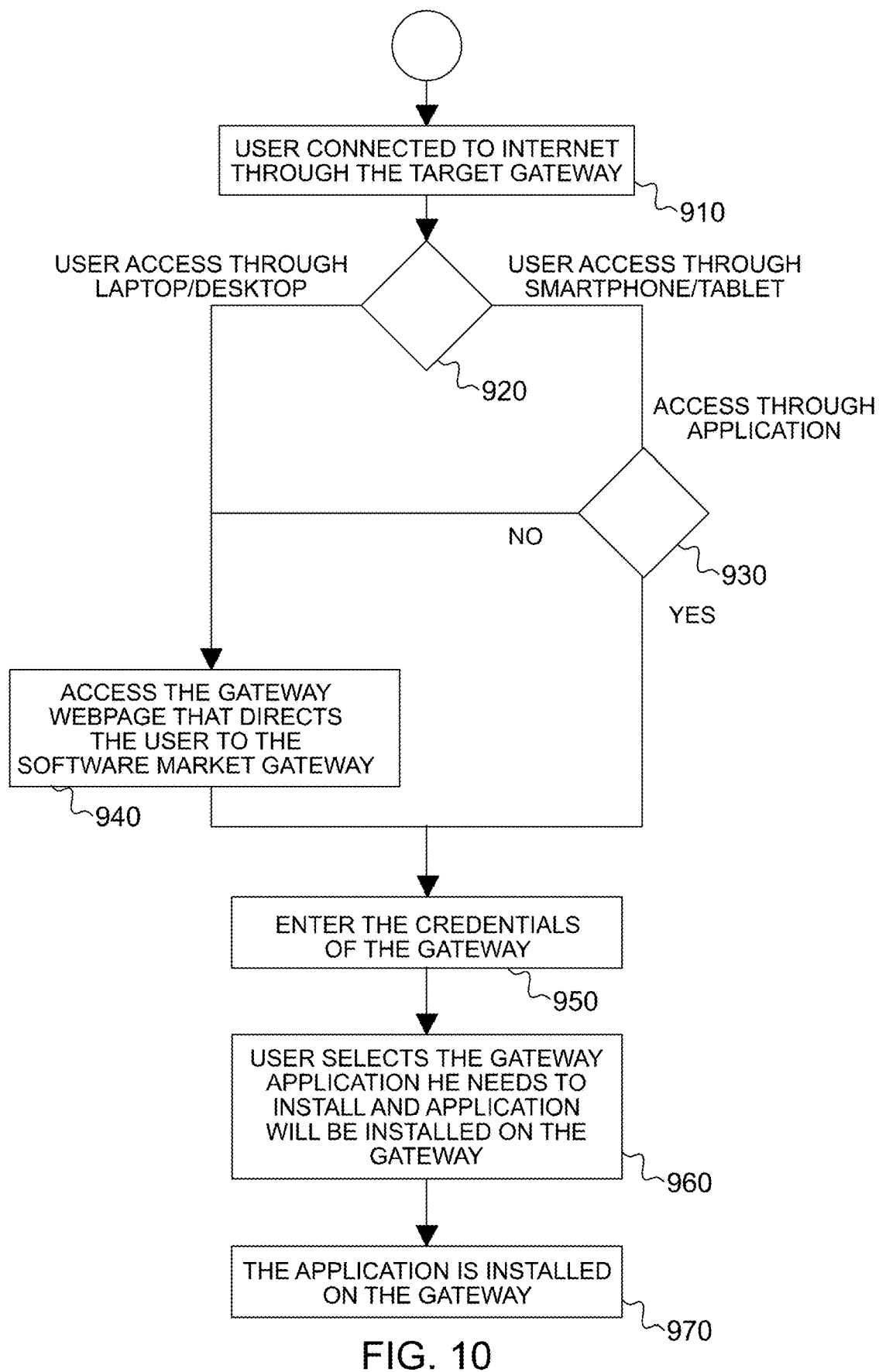
FIG. 10 shows a schematic flow chart of exemplary methods for installing applications.

FIG. 10 shows a schematic flow chart of exemplary methods for installing applications (e.g. the second software module) on the gateway (e.g. the network gateway 100), e.g. by end users on the target gateway.

Laptop or Desktop (920, $1^{st}$ Option)
   User may for example install an application the gateway once he is connected through it by doing the following:
   a—User will be connected to the Internet through the target gateway 910.
   b—User will access a web page in his gateway that connects him to the software market 940.
   c—User must enter the credential of his gateway in order to proceed 950.
   d—User will select the application he need to install by clicking on it 960.
   e—Application will be downloaded and installed on the gateway directly 970).

Smartphone or Tablet (920, $2^{nd}$ Option)
   a—User may for example install application through smart phone or tablet by several ways (as illustrated by decision point 930):
   a.1—Accessing the gateway web page as mentioned in 920, $1^{st}$ option, 930 No-option.
   b.1—Installing mobile application that will sync with the user gateway, 930 Yes-option. The mobile application may pair with the gateway connected to it either by entering the credentials 950 of the gateway of through NFC tagging.

Gateways, e.g. network gateways 100 as introduced in connection with FIG. 1, may comprise home gateways and automotive gateways (e.g. an access point inside a car).

Figure 11:
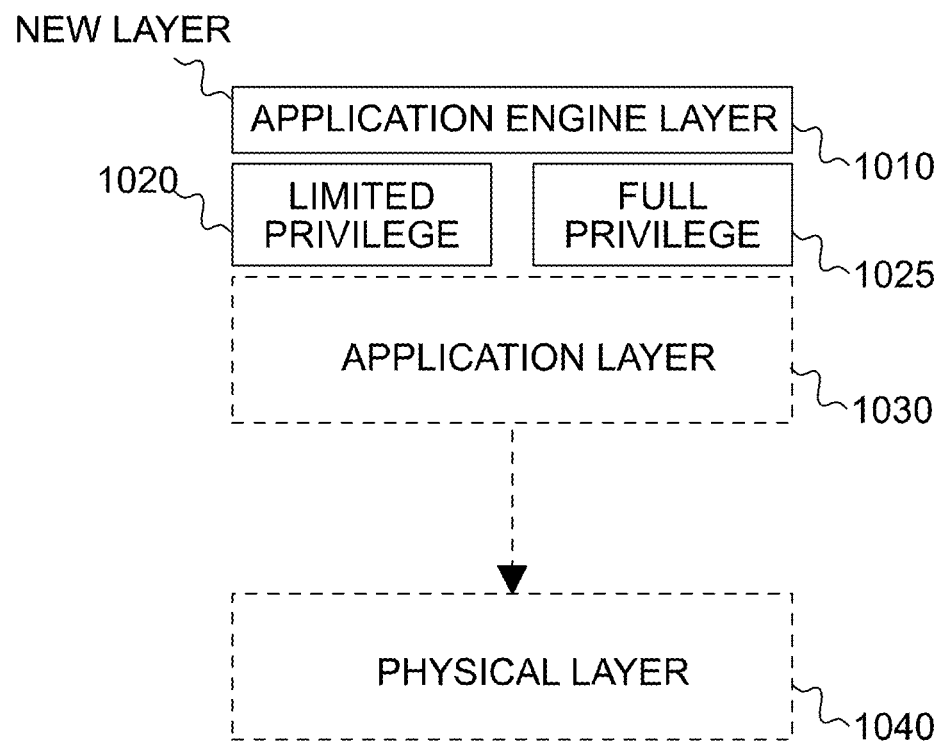
FIG. 11 shows a block diagram of layers used in executing the second software module.

These changes may require modifications in the smart gateway software by adding specific layer in order to adapt the gateway for the installed applications that can run on different platforms on it. FIG. 11 shows a block diagram of layers used in executing the second software module, e.g. a newly introduced application engine layer 1010. The application engine layer 1010 is separated. As shown in FIG. 11, a new layer 1010 may be added in the gateway. The application engine layer is separated from the application layer 1030 using a software interface providing either limited access 1020 or full access 1030. The application layer may provide access to the physical layer 1040 (e.g. provide gateway functionality) This added layer 1010 may provide several functionalities, such as:

1—Collect the required information (e.g. capabilities) from the application (e.g. the second software module) that may be installed, such as the required memory, storage, and/or privilege (e.g. access rights).

2—Gather the current capabilities of the gateway and existing software libraries.

3—Install the new applications on the gateway after checking the gateway capabilities and the application needs.

4—Run the installed application.
   The installed application may run in the new application engine layer under its administration.

5—Secure the gateway from the installed application by providing a fence technique between the installed applications (e.g. the second software module) and the gateway (e.g. the first software module).
   This can be done by defining several levels of privilege (e.g. via a plurality of access rights as introduced in connection with FIG. 1) to the applications. Some application—trusted applications—may have full privilege 1025 to the gateway. Other application or un-trusted application may have limited privilege 1020 to the gateway. So they can't gather or sniff on the current gateway data or configuration.

6—Secure the privacy of the gateway by monitoring the input and output data (e.g. via the software interface introduced in connection with FIG. 1) requested from the application.

This layer may also be used also in virtual cloud gateways, where the applications data running on the cloud can go through this layer to take security actions and make sure that these application are granted to access the gateway.

The aspects and features mentioned and described together with one or more of the previously detailed examples and figures, may as well be combined with one or more of the other examples in order to replace a like feature of the other example or in order to additionally introduce the feature to the other example.

A first example is a device 10 for controlling a network gateway 100. The device 10 comprises at least one network interface 12 configured to communicate in at least one computer network. The device 10 further comprises a processing module 14 configured to at least partially execute at least a first software module and a second software module. The first software module is configured to provide a gateway functionality of the network gateway 100 via the at least one network interface 12. A functionality of the second software module is different from the gateway functionality of the first software module. The second software module is encapsulated from the first software module.

In example 2, the processing module 14 is configured to obtain the second software module from a remote server 20.

In example 3, the processing module 14 is configured to download the second software module directly from the remote server 20.

In example 4, the processing module 14 is configured to obtain the second software module based on information related to software modules previously used by a user of the network gateway.

In example 5, the processing module 14 is configured to obtain the second software module separately from the first software module.

In example 6, the processing module 14 is configured to provide a software interface between the first software module and the second software module.

In example 7, the processing module 14 is configured to limit an access from the second software module to the first software module through the software interface.

In example 8, the processing module 14 is configured to limit the access from the second software module to the first software module through the software interface based on a plurality of access rights.

In example 9, the processing module 14 is configured to monitor an access from the second software module to the first software module through the software interface.

In example 10, the processing module 14 is configured to adjust an access limit and/or a monitoring of the access from the second software module to the first software module through the software interface based on an input of an operator.

In example 11, the first software module is an operating system or a pre-installed software package of the device 10.

In example 12, the second software module is one of an internet of things gateway, a smart home hub, a home server, a home security application, a face recognition application and a virus scanner.

In example 13, the processing module 14 is configured to sandbox the second software module within an execution environment of the first software module.

In example 14, the processing module 14 is further configured to at least partially execute a third software module and the third software module is encapsulated from the first software module and from the second software module.

In example 15, the first software module and/or the second software module are at least partially executed on a remote server.

In example 16 the processing module 14 is configured to determine one or more capabilities required for executing the second software module, and the processing module 14 is configured to obtain the second software module if the device 10 has the required capabilities.

In example 17, the processing module 14 is configured to determine information related to one or more capabilities of the device 10, the processing module 14 is configured to provide the information related to the one or more capabilities of the device 10 to a remote server 20, the processing module 14 is configured to obtain information related to one or more software modules from the remote server 20 based on the information related to the one or more capabilities of the device 10, the processing module 14 is configured to obtain one of the one or more software modules from the remote server 20, and the processing module 14 is configured to at least partially execute the one of the one or more software modules as the second software module.

In example 18, the processing module 14 is configured to provide an interface for administering the device 10, and wherein the processing module 14 is configured to authenticate a user requesting to use the interface using a proximity sensor.

Example 19 is a router 100*a* comprising the device 10 according to one of the examples 1 to 18.

Example 20 is a mobile device 100*b* comprising the device 10 according to one of the examples 1 to 18.

Example 21 is a vehicular gateway 100*c* comprising the device 10 according to one of the examples 1 to 18.

Example 22 is a cloud server 100*d* comprising the device 10 according to one of the examples 1 to 18.

Example 23 is a server 20 comprising at least one interface 22 configured to communicate with a device 10 of a network gateway 100 according to one of the examples 1 to 18. The server 20 further comprises a control module 24 configured to maintain a plurality of software modules, wherein at least a subset of the plurality of software modules are suitable to be executed by the device 10. The control module 24 is further configured to receive a download request related to a software module of the plurality of software modules for the device 10 via the at least one interface 22. The control module 24 is further configured to provide the software module for the device 10 via the at least one interface 22.

In example 24, the control module 24 is configured to obtain information related to one or more capabilities of the device 10 from the device 10, wherein the control module 24 is configured to provide information related to one or more software modules of the plurality of software modules to the device 10 based on the one or more capabilities of the device 10.

In example 25, the control module 24 is configured to directly transmit the software module to the device 10.

In example 26, the control module 24 is configured to indirectly provide the software module for the device 10 via an intermediate device or storage.

Example 27 is a system 30 comprising the network gateway 100 with the device 10 according to one of the examples 1 to 18 and the server 20 according to one of the examples 23 to 26.

Example 28 is an apparatus 10 for controlling a network gateway 100. The apparatus 10 comprises at least one means for communication 12 configured for communicating in at least one computer network. The apparatus 10 further comprises a means for processing 14 configured for at least partially executing at least a first software module and a second software module. The first software module is configured to provide a gateway functionality of the network gateway 100 via the at least one means for communication 12. A functionality of the second software module is different from the gateway functionality of the first software module, and wherein the second software module is encapsulated from the first software module.

In example 29, the means for processing 14 is configured for obtaining the second software module from a remote server apparatus 20.

In example 30, the means for processing 14 is configured for downloading the second software module directly from the remote server apparatus 20.

In example 31, the means for processing 14 is configured for obtaining the second software module based on information related to software modules previously used by a user of the network gateway 100.

In example 32, the means for processing 14 is configured for obtaining the second software module separately from the first software module.

In example 33, the means for processing 14 is configured for providing a software interface between the first software module and the second software module.

In example 34, the means for processing 14 is configured for limiting an access from the second software module to the first software module through the software interface.

In example 35, the means for processing 14 is configured for limiting the access from the second software module to the first software module through the software interface based on a plurality of access rights.

In example 36, the means for processing 14 is configured for monitoring an access from the second software module to the first software module through the software interface.

In example 37, the means for processing 14 is configured for adjusting an access limit and/or a monitoring of the access from the second software module to the first software module through the software interface based on an input of an operator.

In example 38, the first software module is an operating system or a pre-installed software package of the apparatus 10.

In example 39, the second software module is one of an internet of things gateway, a smart home hub, a home server, a home security application, a face recognition application and a virus scanner.

In example 40, the means for processing 14 is configured for sandboxing the second software module within an execution environment of the first software module.

In example 41, the means for processing 14 is further configured for at least partially executing a third software module, wherein the third software module is encapsulated from the first software module and from the second software module.

In example 42, the first software module and/or the second software module are at least partially executed on a remote server.

In example 43, the means for processing 14 is configured for determining one or more capabilities required for executing the second software module, and the means for processing 14 is configured for obtaining the second software module if the apparatus 10 has the required capabilities.

In example 44, the means for processing 14 is configured for determining information related to one or more capabilities of the apparatus 10, the means for processing 14 is configured for providing the information related to the one or more capabilities of the apparatus 10 to a remote server apparatus 20, the means for processing 14 is configured for obtaining information related to one or more software modules from the remote server apparatus 20 based on the information related to the one or more capabilities of the apparatus 10, the means for processing 14 is configured for obtaining one of the one or more software modules from the remote server apparatus 20, and the means for processing 14 is configured for at least partially executing the one of the one or more software modules as the second software module.

In example 45, the means for processing 14 is configured for providing an interface for administering the apparatus 10, and wherein the means for processing 14 is configured for authenticating a user requesting to use the interface using a means for proximity sensing.

Example 46 is a router 100*a* comprising the apparatus 10 according to one of the examples 28 to 45.

Example 47 is a mobile device 100*b* comprising the apparatus 10 according to one of the examples 28 to 45.

Example 48 is a vehicular gateway 100*c* comprising the apparatus 10 according to one of the examples 28 to 45.

Example 49 is a cloud server 100*d* comprising the apparatus 10 according to one of the examples 28 to 45.

Example 50 is a server apparatus 20 comprising at least one means for communication 22 configured for communicating with an apparatus 10 of a network gateway 100 according to one of the examples 28 to 45. The server apparatus 20 further comprises a means for controlling 24 configured for maintaining a plurality of software modules, wherein at least a subset of the plurality of software modules are suitable to be executed by the apparatus 10. The means for controlling 24 is further configured for receiving a download request related to a software module of the plurality of software modules for the apparatus 10 via the at least one means for communication 22. The means for controlling 24 is further configured for providing the software module for the apparatus 10 via the at least one means for communication 22.

In example 51, the means for controlling 24 is configured for obtaining information related to one or more capabilities of the apparatus 10 from the apparatus 10, and the means for controlling 24 is configured for providing information related to one or more software modules of the plurality of software modules to the apparatus 10 based on the one or more capabilities of the apparatus 10.

In example 52, the means for controlling 24 is configured for directly transmitting the software module to the apparatus 10.

In example 53, the control module 24 is configured for indirectly providing the software module for the apparatus 10 via an intermediate device or storage.

Example 54 is a System 30 comprising the network gateway 100 with the apparatus 10 according to one of the examples 28 to 45 and the server apparatus 20 according to one of the examples 50 to 53.

Example 55 is a method for controlling a network gateway 100. The method comprises at least partly executing 110 at least a first software module and a second software module. The first software module is configured to provide a gateway functionality of the network gateway 100. A functionality of the second software module is different from the gateway functionality of the first software module. The method further comprises encapsulating 120 the second software module from the first software module.

In example 56, the method further comprises obtaining the second software module from a remote server 20.

In example 57, the obtaining of the second software module comprises downloading the second software module directly from the remote server 20.

In example 58, the obtaining of the second software module is based on information related to software modules previously used by a user of the network gateway 100.

In example 59, the second software module is obtained separately from the first software module.

In example 60, the method further comprises providing a software interface between the first software module and the second software module.

In example 61, the method further comprises limiting an access from the second software module to the first software module through the software interface.

In example 62, the limiting of the access from the second software module to the first software module through the software interface is based on a plurality of access rights.

In example 63, the method further comprises monitoring an access from the second software module to the first software module through the software interface.

In example 64, the method further comprises adjusting an access limit and/or a monitoring of the access from the second software module to the first software module through the software interface based on an input of an operator.

In example 65, the first software module is an operating system or a pre-installed software package of the network gateway 100.

In example 66, the second software module is one of an internet of things gateway, a smart home hub, a home server, a home security application, a face recognition application and a virus scanner.

In example 67, the method further comprises sandboxing the second software module within an execution environment of the first software module.

In example 68, the executing 110 further comprises at least partially executing a third software module, wherein the third software module is encapsulated from the first software module and from the second software module.

In example 69, the first software module and/or the second software module are at least partially executed on a remote server.

In example 70, the method further comprises determining one or more capabilities required for executing the second software module, and obtaining the second software module if the network gateway has the required capabilities.

In example 71, the method further comprises determining information related to one or more capabilities of the network gateway 100, providing the information related to the one or more capabilities of the network gateway 100 to a remote server 20, for obtaining information related to one or more software modules from the remote server 20 based on the information related to the one or more capabilities of the network gateway 100, obtaining one of the one or more software modules from the remote server 20, and at least partially executing the one of the one or more software modules as the second software module.

In example 72, the method further comprises providing an interface for administering the network gateway 100 and authenticating a user requesting to use the interface using a proximity sensor.

Example 73 is a server method comprising maintaining 210 a plurality of software modules, wherein at least a subset of the plurality of software modules are suitable to be executed by a network gateway 100. The server method further comprises receiving 220 a download request related to a software module of the plurality of software modules for the network gateway 100. The server method further comprises providing 230 the software module for the network gateway 100.

In example 74, the server method further comprises obtaining information related to one or more capabilities of the network gateway 100 from the network gateway 100, and providing information related to one or more software modules of the plurality of software modules to the network gateway 100 based on the one or more capabilities of the network gateway 100.

In example 75, the providing 230 comprises directly transmitting the software module to the network gateway 100.

In example 76, the providing 230 comprises indirectly providing the software module for the network gateway 100 via an intermediate device or storage.

Example 77 is a machine readable storage medium including program code, when executed, to cause a machine to perform the method of one of the examples 55 to 76.

Example 78 is a computer program having a program code for performing the method of at least one of the examples 55 to 76, when the computer program is executed on a computer, a processor, or a programmable hardware component.

Example 79 is a machine readable storage including machine readable instructions, when executed, to implement a method or realize an apparatus as claimed in any pending claim.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F) PGAs), programmed to perform the acts of the above-described methods.

The description and drawings merely illustrate the principles of the disclosure. Furthermore, all examples recited herein are principally intended expressly to be only for pedagogical purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a sensor signal", "means for generating a transmit signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and nonvolatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or—steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A device, comprising:
    at least one network interface configured to communicate in at least one computer network; and
    a processing module configured to at least partially execute, at least a first software module and a second software module, wherein:
        the first software module is configured to provide a gateway functionality of a network gateway via the at least one network interface,
        a functionality of the second software module is different from the gateway functionality,
        the processing module is configured to:
            redirect a write access of the second software module to resources of the first software module in response to a disallowed access of the second software module,
            determine one or more capabilities required for executing the second software module,
            transmit the one or more capabilities to a remote server, and
            in response to the remote server determining the one or more capabilities will execute the second software module, obtain the second software module, where the second software module is selected by the remote server based on the one or more capabilities.

2. The device according to claim 1, wherein the processing module is configured to obtain the second software module from the remote server.

3. The device according to claim 2, wherein the processing module is configured to download the second software module directly from the remote server.

4. The device according to claim 1, wherein the processing module is configured to obtain the second software module based on information related to software modules previously used by a user of the network gateway.

5. The device according to claim 1, wherein the processing module is configured to obtain the second software module separately from the first software module.

6. The device according to claim 1, wherein the processing module is configured to provide a software interface between the first software module and the second software module.

7. The device according to claim 6, wherein the processing module is configured to limit an access from the second software module to the first software module through the software interface.

8. The device according to claim 7, wherein the processing module is configured to limit the access from the second software module to the first software module through the software interface based on a plurality of access rights.

9. The device according to claim 6, wherein the processing module is configured to monitor an access from the second software module to the first software module through the software interface.

10. The device according to claim 6, wherein the processing module is configured to adjust an access limit and/or a monitoring of the access from the second software module to the first software module through the software interface based on an input of an operator.

11. The device according to claim 1, wherein the first software module is an operating system or a pre-installed software package of the device.

12. The device according to claim 1, wherein the second software module is one of an internet of things gateway, a smart home hub, a home server, a home security application, a face recognition application or a virus scanner.

13. The device according to claim 1, wherein the processing module is configured to sandbox the second software module within an execution environment of the first software module.

14. The device according to claim 1, wherein the processing module is further configured to at least partially execute a third software module, wherein the third software module is encapsulated from the first software module and from the second software module.

15. The device according to claim 1, wherein the first software module and/or the second software module are at least partially executed on the remote server.

16. The device according to claim 1, wherein the processing module is configured to provide an interface for administering the device, and wherein the processing module is configured to authenticate a user requesting to use the interface using a proximity sensor.

17. A router comprising the device according to claim 1.

18. A server comprising:
at least one interface, configured to communicate with the device according to claim 1; and
a control module, configured to:
maintain a plurality of software modules, wherein at least a subset of the plurality of software modules are suitable to be executed by the device;
receive a download request related to a software module of the plurality of software modules for the device via the at least one interface; and to
provide the software module for the device via the at least one interface.

19. The server according to claim 18, wherein the control module is configured to obtain information related to one or more capabilities of the device from the device, wherein the control module is configured to provide information related to one or more software modules of the plurality of software modules to the device based on the one or more capabilities of the device.

20. A method comprising:
at least partly executing at least a first software module and a second software module, wherein the first software module is configured to provide a gateway functionality of a network gateway, wherein a functionality of the second software module is different from the gateway functionality of the first software module;
redirecting a write access of the second software module to resources of the first software module in response to a disallowed access of the second software module;
determining one or more capabilities required for executing the second software module at a device;
transmitting the one or more capabilities to a remote server, determining that the device has the one or more capabilities required for executing the second software module;
in response to the remote server determining the one or more capabilities will execute the second software module, obtaining the second software module, where the second software module is selected by the remote server based on the one or more capabilities; and
encapsulating the second software module from the first software module, wherein the second software module is blocked from access to at least some of the gateway functionality of the network gateway,
wherein the functionality of the second software module is comprised within a virtual machine.

21. A non-transitory machine readable storage medium including program code, when executed, to cause a machine to perform operations comprising:
at least partly executing at least a first software module;
at least partly executing a second software module on an application engine layer, wherein the first software module is configured to provide a gateway functionality of a network gateway, wherein a functionality of the second software module is different from the gateway functionality of the first software module;
at least partly executing a third software module on the application engine layer; and
encapsulating the second software module from the first software module on the application engine layer and encapsulating the third software module from the first software module on the application engine layer, wherein:
the second software module is blocked from access to at least some of the gateway functionality of the network gateway,
the third software module communicates with the second software module via the first software module,
redirect a write access of the second software module to resources of the first software module in response to a disallowed access of the second software module,
one or more capabilities required for executing the second software module at a device are determined,
transmit the one or more capabilities to a remote server, and
in response to the remote server determining the one or more capabilities will execute the second software module, the second software module is obtained, where the second software module is selected by the remote server based on the one or more capabilities.

* * * * *